(No Model.)
C. K. FOSTER.
POISON OR FERTILIZER DISTRIBUTER.
No. 446,772. Patented Feb. 17, 1891.
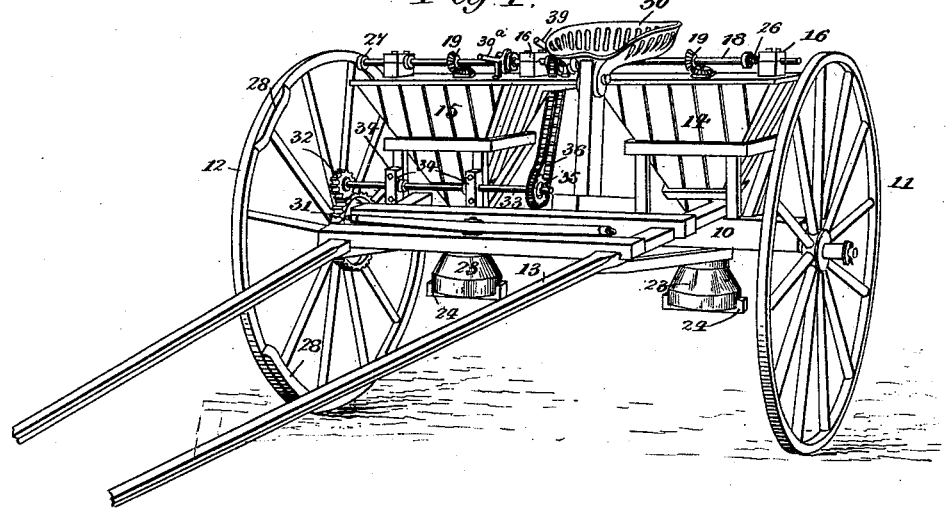
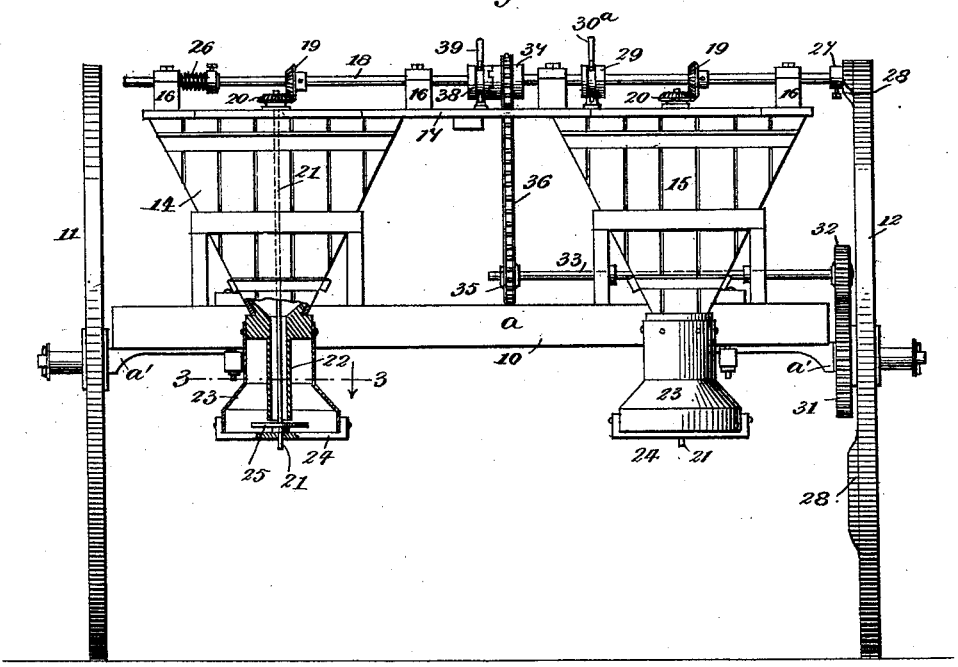
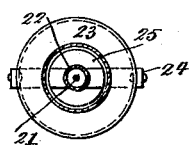
WITNESSES:
INVENTOR:
C. K. Foster
BY Munn & Co.
ATTORNEYS

UNITED STATES PATENT OFFICE.

CHARLES K. FOSTER, OF IOLA, WISCONSIN.

POISON OR FERTILIZER DISTRIBUTER.

SPECIFICATION forming part of Letters Patent No. 446,772, dated February 17, 1891.

Application filed November 1, 1890. Serial No. 370,041. (No model.)

*To all whom it may concern:*

Be it known that I, CHARLES K. FOSTER, of Iola, in the county of Waupaca and State of Wisconsin, have invented a new and Improved Poison or Fertilizer Distributer, of which the following is a full, clear, and exact description.

My invention relates to an improved machine for distributing poison or fertilizer, and is especially adapted for treating potato and similar plants.

The object of the invention is to provide an implement so constructed that it will automatically drop the material carried upon the hills only, and, further, to provide a means whereby the driver may by a convenient manipulation of the implement cause the material to drop upon any hill which may be out of regular alignment or may cause the material to be continuously spilled when, for instance, the plants are high and spread from hill to hill.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of the implement, viewed from the front thereof. Fig. 2 is a rear elevation, partly in section; and Fig. 3 is a horizontal section taken on the line 3 3 of Fig. 2.

The body of the implement consists of an axle 10, upon which two carrying-wheels 11 and 12 are mounted, one of which is adapted to constitute the drive-wheel, shafts 13, attached to the axle in any suitable or approved manner, and two hoppers 14 and 15, supported by the axle, which hoppers extend beyond the rear face of their support, as is best illustrated in Fig. 2. The axle is preferably made in sections consisting of a beam or bar *a* and spindles *a'*, attached to the ends of the beam, upon which spindles the wheels 11 and 12 are mounted.

In suitable bearings 16, secured to the upper face of the hoppers and a bridge-piece 17, connecting the hoppers, a line-shaft 18 is journaled, the said shaft being provided over each hopper with a bevel-gear 19, the bevel-gears 19 being adapted to mesh with similar gears 20, fast upon the upper ends of the perpendicular shafts 21, which latter shafts are passed downward through the hoppers, extending through delivery-tubes 22, surrounding the outlets of the hopper, as shown in Fig. 2. An inverted-funnel-shaped casing 23 is attached to the bottom of the body of each hopper, surrounding the delivery-tubes 22, the casing being of much greater diameter than the delivery-tubes. A bar 24 is attached to the bottom of each of the casings 23, extending diametrically across the same from side to side, and in the bars 24 the lower ends of the perpendicular shafts 21 are journaled in any suitable or approved manner. A space intervenes the bars 24 and the lower ends of the delivery-tubes 22, and between the said bars and delivery-tubes disks 25 are securely fastened to the perpendicular shafts 21, the said disks being adapted to receive the material dropping from the hoppers through the delivery-tubes 22. The disks are of much less diameter than the diameter of the lower portion of the inverted-funnel-shaped casing. The gears 19 are kept normally out of engagement with the gears 20 by means of a spring 26, which is wound around the line-shaft 18 near one end, having a bearing against one of the end boxes 16 and also against a collar fast upon the shaft. The outer extremity of the shaft opposite that carrying the spring 26 is provided with a head 27, which head is adapted for engagement with cam-faced blocks 28, secured to the inner face of the rim of the wheel 12, and when the blocks are in engagement with the head of the line-shaft the gears 19 of said shaft mesh with the gears of the perpendicular shafts 21, and the disks 25 are revolved to distribute the material contained in the hoppers. When the line-shaft is out of engagement with the wheel 12, the gears of said shaft and the perpendicular shafts are out of engagement, and no distribution of material is made. The cam-surfaces are fixed upon the wheel so that they will engage with the line-shaft when the distributing ends of the hoppers are over hills only, and as the potato, which is the prime plant to be treated by the implement, is usually planted in hills about three feet apart the arrangement of the cam-blocks is ordinarily such as to operate the line-shaft and cause the material to be spilled at intervals of three feet. It often happens, however, that some of the hills are closer together than three feet—that is, out of alignment—and in order that such may receive treatment a collar 29 is fixed upon the line-shaft 18 convenient to the driver's-seat 30, which is located above and between the hoppers, and the said collar is engaged by a lever 30ª. By this construction, when the driver finds the boxes over one or two hills not regularly spaced, by manipulating the lever 30ª the shaft is carried in the direction of the wheel 12, contracting the spring 26 until the gears 19 of the line-shaft are brought in mesh with the gears 20 of the perpendicular shafts, and the moment the hill is passed by releasing the lever the spring 26 acts to restore the line-shaft to its normal position, and the revolution of the perpendicular shafts ceases. The line-shaft is driven from the wheel 12, and this is effected by securing a spur-wheel 31 to the hub or inner face of said wheel, which wheel meshes with a pinion 32, fast upon a drive-shaft 33, mounted in bearings 34, located in front of one of the hoppers, as shown best in Fig. 1. The drive-shaft carries at or near one extremity a sprocket-wheel 35, which is connected by a chain belt 36 with a similar wheel 37, loosely mounted upon the line-shaft. The upper sprocket-wheel 37 is provided with a clutch-face adapted for engagement with a clutch 38, splined upon the line-shaft and capable of sliding thereon. The clutch is operated by a suitable lever 39, located convenient to the driver's seat, and when the clutch is in engagement with the sprocket-wheel 37 motion is communicated to the line-shaft from the drive-shaft, and when the clutch and sprocket-wheel are out of engagement the wheel runs loosely upon the shaft. It will be observed that as the material falls from the hopper upon the disks it is thrown by centrifugal force in engagement with the inclined sides of the casings, from whence it drops downward over and around the hills. When the plants have grown to such an extent that they extend from hill to hill, forming virtually a continuous line, it is necessary that the feed of the poison to be distributed should be continuous, and when plants of this character are to be treated the lever 30ª is manipulated to cause the line-shaft to gear with the perpendicular shafts, and it is locked in such position until the end of the line is reached, when the lever is released and the line-shaft is thrown out of engagement with the drive-shaft.

This machine is also adapted for sowing plaster or clover or other seed broadcast, which is accomplished by keeping the gears 19 and 20 continuously in mesh by means of the lever 30ª; but for such use the funnels 23 would preferably be somewhat larger in order to insure proper spreading of the seed.

Having thus described my invention, I claim as new and desire to secure by Letters Patent—

1. In an implement of the character described, the combination, with a hopper, of a flaring casing surrounding the outlet of the hopper, and a rotary disk within the casing below the hopper-outlet, as and for the purpose specified.

2. In an implement of the character described, the combination, with a hopper and an attached outlet-tube, of a flaring casing surrounding the tube, a rotary disk within the casing beneath the tube, and an intermittent driving mechanism connected with the disk, as and for the purpose specified.

3. In an implement of the character described, the combination, with a hopper and a shifting shaft above the hopper, of a flaring casing attached to the hopper surrounding the outlet, a shaft passed through the hopper, a gear-connection between the shifting shaft and hopper, and a disk secured to the hopper-shaft below the outlet of said hopper, as and for the purpose specified.

4. In an implement of the character described, the combination, with the hopper, an outlet-tube secured thereto, a casing surrounding the tube, and a rotary disk within the casing beneath the tube, of a laterally-shifting shaft, a wheel provided with cam-faces adapted to engage with the shaft, a driving mechanism connected with the shifting shaft, and a connection between the said shaft and the said disk, as and for the purpose specified.

5. In an implement of the character described, the combination, with the supporting-wheels of the implement, one of which is provided with cam-surfaces, a hopper, a flaring casing surrounding the hopper, a shaft journaled in the hopper and casing, and a disk secured to the shaft beneath the hopper-outlet, of a line-shaft capable of endwise movement and adapted for engagement with said cam-surfaces, a gear-connection between the line-shaft and the hopper-shaft, and a driving mechanism connected with the line-shaft, substantially as shown and described.

CHARLES K. FOSTER.

Witnesses:
AUSTIN A. BIERCE,
O. G. FROGNER.